United States Patent [19]
Gordon et al.

[11] Patent Number: 5,697,642
[45] Date of Patent: Dec. 16, 1997

[54] PASSENGER SAFETY RESTRAINT WITH PRETENSIONER

[75] Inventors: Ian Gordon; Donald E. Armstrong; David Eric Chicken, all of Carlisle, United Kingdom

[73] Assignee: AlliedSignal Ltd., Bristol, United Kingdom

[21] Appl. No.: 663,066

[22] PCT Filed: Dec. 15, 1994

[86] PCT No.: PCT/GB94/02785

§ 371 Date: Jun. 13, 1996

§ 102(e) Date: Jun. 13, 1996

[87] PCT Pub. No.: WO95/16590

PCT Pub. Date: Jun. 22, 1995

[30] Foreign Application Priority Data

Dec. 15, 1993 [GB] United Kingdom ............. 9325607

[51] Int. Cl.[6] .................................................. B60R 21/00
[52] U.S. Cl. ...................................... 280/806; 297/478
[58] Field of Search ............................... 280/806, 801.1, 280/808; 180/271; 297/478

[56] References Cited

U.S. PATENT DOCUMENTS

| | | | |
|---|---|---|---|
| 4,345,665 | 8/1982 | Fohl | 180/270 |
| 4,359,237 | 11/1982 | Gavagan et al. | 280/808 |
| 4,451,062 | 5/1984 | Ziv | 280/806 |
| 4,592,571 | 6/1986 | Baumann et al. | 280/806 X |

FOREIGN PATENT DOCUMENTS

| | | |
|---|---|---|
| A-535389 | 4/1993 | European Pat. Off. . |
| A-577073 | 1/1994 | European Pat. Off. . |
| A-2203331 | 5/1974 | France . |
| A-2315878 | 1/1977 | France . |
| A-3620544 | 12/1987 | Germany . |
| U-9300430 | 5/1993 | Germany . |
| A-2016263 | 9/1979 | United Kingdom . |
| 8806541 | 9/1988 | WIPO ............. 280/806 |

*Primary Examiner*—Christopher P. Ellis
*Attorney, Agent, or Firm*—Markell Seitzman

[57] ABSTRACT

The present invention provides a pneumatically operable indication of when a pretensioner has operated in a vehicle passenger safety restraint system. The indication may be audible or visible, for example an inflatable brightly coloured balloon in the vehicle trim or a whistle or a flag. Such an indication ensures that the vehicle owner knows when the pretensioner feature of his vehicle is not available for a subsequent crash condition so that he can seek re-setting or servicing of the pretensioner at the earliest opportunity.

20 Claims, 2 Drawing Sheets

PASSENGER SAFETY RESTRAINT WITH PRETENSIONER

BACKGROUND AND SUMMARY OF THE INVENTION

The invention relates to a passenger safety restraint including a pretensioner and especially to indication of the activated state of a pretensioner.

In safety restraint systems of passenger vehicles, it is well known to provide a seat belt for the occupant of each seat and to provide such seat belts with belt webbing retractors which provide neat partial storage of the belt webbing when not in use. Such retractors normally provide a light rewinding spring and webbing or reel locking which is operable in emergency. The light rewinding spring is designed primarily for passenger comfort and for crash conditions it has been proposed to include not only means to cause locking of the reel or webbing but an additional webbing tensioning feature or pretensioner to ensure that a seat belt is drawn more tightly about the occupant. Such a seat belt pretensioner may for example be designed to shorten one of the belt anchorages or to rotate the webbing reel of the respective retractor in a belt tightening direction, such action being initiated by means which senses a crash condition. A pretensioner may be actuated by any suitable means and more particularly a releasable compressed spring or a pyrotechnic device may be employed.

One possible problem with such a pretensioner is that it is usually concealed from normal view and any activation without the knowledge of the vehicle owner can result in the pretensioning feature not being available for a subsequent crash condition and the object of the present invention is to provide means to give an immediate and possibly a sustained indication that such activation has occurred so that resetting or servicing may be effected at the earliest opportunity.

According to the invention there is provided a vehicle passenger safety restraint including a seat belt deployable to resist movement of an occupant from a desired position in a seat in the event of a crash and including pretensioner means operable to release energy to tighten the seat belt at an early stage of the crash and characterised by pneumatically operable indication means for providing an indication of said pretensioner means having operated.

In a case where the pretensioner is operable by a pyrotechnic device or compressed gas storage device gas under pressure which is produced or released may be used to operate audible or visible indication means.

BRIEF DESCRIPTION OF THE DRAWINGS

In order that the invention may be more clearly understood and readily carried into effect the same will now be further described by way of examples with reference to the accompanying drawings of which.

DETAILED DESCRIPTION OF THE DRAWINGS

Figure 1:
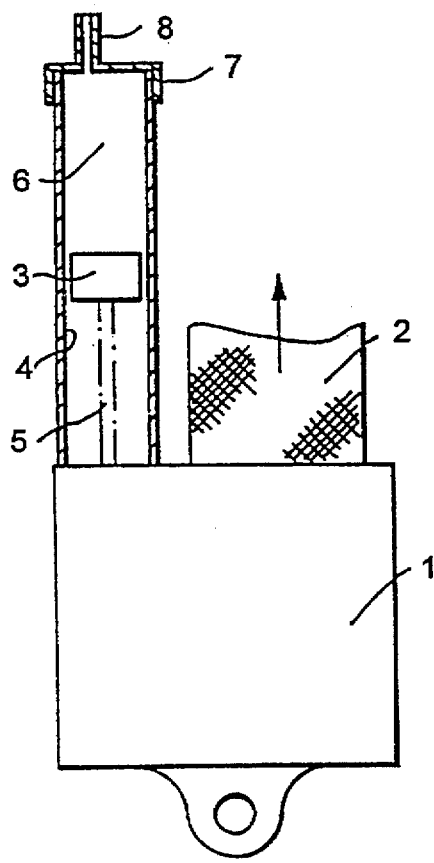
FIG. 1, illustrates an emergency locking safety belt webbing retractor with a pretensioner

Referring to FIG. 1, this illustrates in diagrammatic form a typical passenger vehicle front seat belt emergency locking retractor 1 for the webbing 2 of the seat belt. Usually, such a retractor is located on or within the vehicle 'B' post and may additionally incorporate a pyrotechnic pretensioner device for rapidly winding the reel to tighten the webbing in the early stages of the onset of crash conditions. Such conditions are usually sensed by means for detecting more than normal vehicle deceleration. The pretensioner as indicated in FIG. 1 comprises a piston 3 and cylinder 4 arrangement, the piston being connected via a flexible cable 5 which is wound on a spool rotatably engageable with the webbing reel. For the purposes of the present invention the outer end 6 of the cylinder 4 is fitted with an end cap 7 provided with a small connection piece 8 to which communication with the interior of the cylinder on the 'atmospheric' side of the piston 3. Rapid upward movement of the piston 3 is therefore able to produce an elevated pressure signal at the connection piece 8. In accordance with the invention such pneumatic signal is used to provide visible or audible indication that the pretensioner has been activated.

Various forms of such indication will now be briefly discussed.

Figure 2:
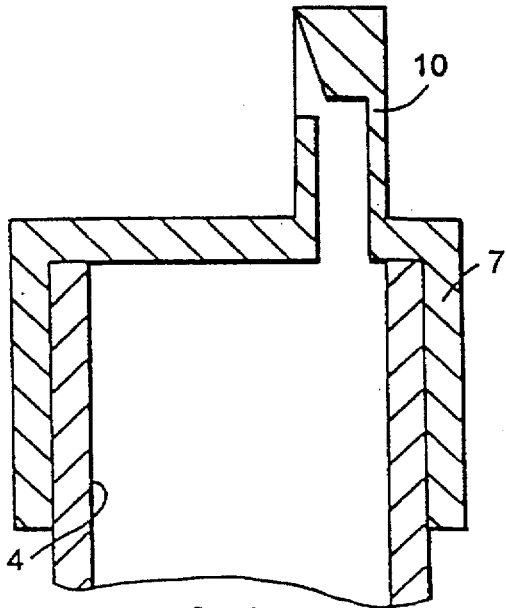
FIG. 2, illustrates part of a retractor in accordance with FIG. 1 incorporating audible indication

In FIG. 2, the connection piece 8 of FIG. 1 may be fitted with or replaced by an audible whistle 10 which will warn the vehicle driver that the pretensioner has just been activated. Such a warning is clearly only sustained for as long as it takes for the gas pressure in the cylinder 4 to descend below a level at which the whistle is inaudible.

Figure 3:
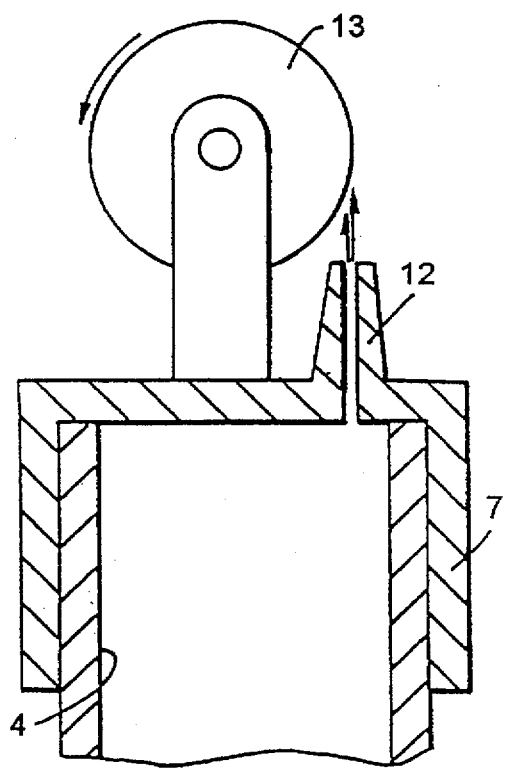
FIG. 3, illustrates part of a retractor in accordance with FIG. 1 incorporating audible indication

In FIG. 3, the connection piece is adapted to form a turbine nozzle 12 which produces sufficient energy to activate a rotatable siren whistle wheel. Again, the warning provided thereby is limited to the period of time for which the siren wheel rotates at sufficient speed.

In either of the audible devices mentioned with reference to FIG. 2 or FIG. 3, a small balloon like element or accumulator may be included in the connection to the device in order to prolong the length of the sound produced.

Figure 4A:
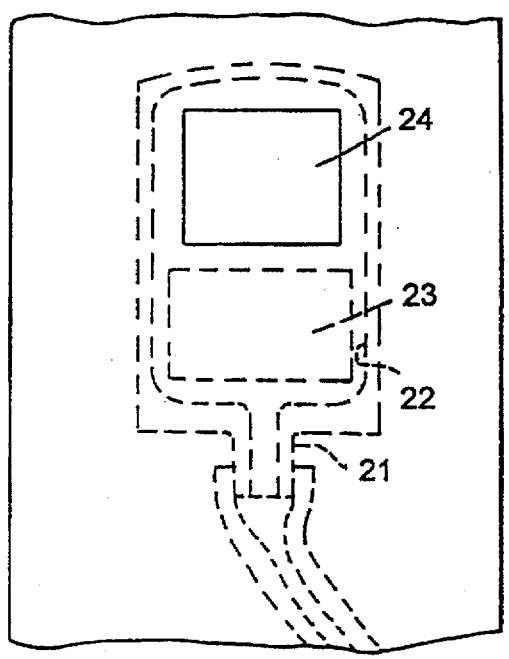
FIG. 4a and FIG. 4b, illustrate a pneumatic indication device
Figure 4B:
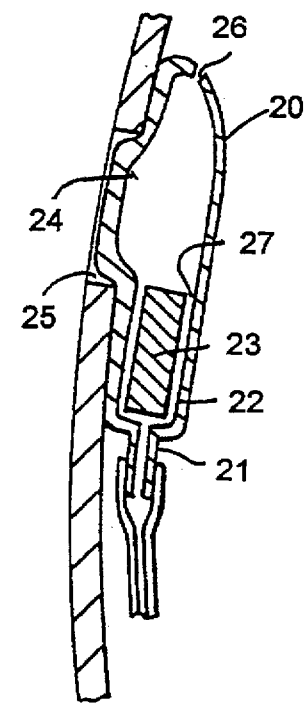

Referring to FIG. 4a and 4b, a pneumatically operable visible warning device is illustrated in front and sectioned views. Typically such a device may itself be mounted in the vehicle 'B' post, at or near the normally provided shoulder height webbing guide. The indicator has an enclosure denoted by reference 20 which has a connecting piece integral with the lower part 22, 21 via which it is connected via a flexible plastic tube to the connection piece 8 to the pretensioner of FIG. 1. The enclosure 20 is provided with a flat brightly coloured, typically fluorescent yellow, plug 23 which normally rests with only slight clearances in the lower part 22 of the enclosure. Above the plug 23 the enclosure has a transparent upper portion 24 which is normally positioned behind a window 25 in the vehicle trim. The upper portion 24 is vented at 26 and is provided with a small flexible non-return barb 27.

In operation, when a pressure signal is transmitted via the plastic tube to the connecting piece 21 at the lower part 22 of the housing 20, the plug is projected upwards by the gas pressure and is retained in the upward position by the non-return barb 27. The plug is then visible in the window 25 and provides a permanent indication that the pretensioner has been activated.

Figure 5:
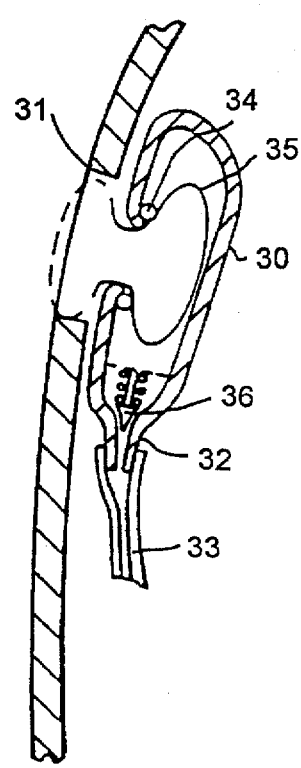
FIG. 5, illustrate an alternative pneumatic indication device.

An alternative form of visible indication is illustrated in FIG. 5, wherein a small housing 30 is mounted between an aperture 31 in the 'B' post, preferably approximately at shoulder height. The housing again has a connecting piece 32 for connecting to the pretensioner via a plastic tube 33. A one-way valve 36 is provided at the interior of the housing and housing has a further aperture over which a small brightly coloured flexible inflatable element 35 is fitted. When the pretensioner is activated, the gas pressure communicated via tube 32 is applied via the one-way valve 36 to cause the balloon-like element 35 to be ejected outwardly to adopt a prominently visible inflated condition in the aperture 31. Even when the gas pressure in the tube 33 has subsided, the one-way valve serves to hold the element 35 inflated for a somewhat longer time and at all events, once ejected, it remains readily visible to the user of the vehicle for some time.

Although the invention has been described with reference to a pretensioner associated with an emergency locking retractor, it may equally be applied to a pretensioner such as may provide pretensioning at a buckle anchorage.

Again, in the case of a pretensioner which operates by releasing the force of a compressed or tensioned spring the pretensioner may be provided with a small piston displaceable in a cylinder by the action of the spring. The piston can generate a pressure signal when pretensioner is operated.

We claim:

1. A vehicle passenger safety restraint comprising a seat belt deployable to resist movement of an occupant from a desired position in a seat in the event of a crash and further comprising pretensioner means operable to tighten the seat belt at a early stage of the crash, wherein pneumatically operable indication means are provided for indicating that the pretensioner means has operated.

2. A vehicle passenger safety restraint according to claim 1, wherein the pretensioner is operable by a pyrotechnic device.

3. A vehicle passenger safety restraint according to claim 1, wherein the pretensioner is operable by a compressed gas storage device.

4. A vehicle passenger safety restraint according to claim 1, wherein the indication means is operable to produce an audible indication signal.

5. A vehicle passenger safety restraint according to claim 1, wherein the indication means is operable to produce a visible indication signal.

6. A vehicle passenger safety restraint according to claim 1, wherein the indication means is operable by gas produced or released during operation of the pretensioner.

7. A vehicle passenger safety restraint comprising a seat belt deployable to resist movement of an occupant from a desired position in a seat in the event of a crash; pretensioner means operable to tighten the seat belt at an early state of the crash, pneumatically operable indication means for indicating that the pretensioner means has operated, the indicating means operable by the gas produced or released during operation of the pretensioner;

wherein the indication means comprises a flag operable to be moved by gas produced or released during operation of the pretensioner means, from a position in which it is not visible, into a position where it is visible to a passenger and indicate operation of the pretensioner.

8. A vehicle passenger safety restraint comprising a seat belt deployable to resist movement of an occupant from a desired position in a seat in the event of a crash; pretensioner means operable to tighten the seat belt at an early state of the crash, pneumatic means for producing a positive pressure by gas produced or released during the operation of the pretensioner; pneumatically operable indication means for indicating that the pretensioner means has operated, the indicating means operable by the gas produced or released during operation of the pretensioner;

wherein the pretensioner has a piston movable within a cylinder and wherein the pneumatic means includes a portion of the cylinder provided with a narrow aperture at the end to which the piston moves during the pretensioning operation so that during pretensioning an elevated pressure signal is produced at the aperture.

9. A vehicle passenger safety restraint according to claim 8, wherein a whistle is connected to the aperture.

10. A vehicle passenger safety restraint according to claim 8 comprising a turbine nozzle connected to the aperture to activate a rotatable siren-whistle wheel.

11. A vehicle passenger safety restraint according to claim 8 wherein the indication means includes audible means for producing an audible indication signal and further comprises reservoir means connected between the aperture and the audible means to prolong the length of the sound produced.

12. A vehicle passenger safety restraint according to claim 7 wherein the flag comprises a flexible inflatable element operable to be inflated by pneumatic pressure on operation of the pretensioner to adopt a prominently visible inflated condition.

13. A vehicle passenger safety restraint according to claim 12, wherein the flexible inflatable element is brightly coloured and is mountable in an aperture in the vehicle trim.

14. A vehicle passenger safety restraint according to claim 12, comprising a one-way valve connected upstream of the flexible inflatable element.

15. A vehicle passenger safety restraint according to claim 9 further comprising reservoir means connected between the aperture and the indication means to prolong the length of the sound produced.

16. A vehicle passenger safety restraint according to claim 10 further comprising reservoir means connected between the aperture and the indication means to prolong the length of the sound produced.

17. A vehicle passenger safety restraint according to claim 7 comprising a one-way valve connected upstream of the flag.

18. The vehicle passenger safety restraint as defined in claim 7 wherein the flag is remote from the pretensioner.

19. The vehicle passenger safety restraint as defined in claim 12 wherein the flexible inflatable element is remote from the pretensioner.

20. A vehicle passenger safety restraint according to claim 8, wherein the indication means includes audible means for producing an audible indication signal.

* * * * *